No. 730,445. PATENTED JUNE 9, 1903.
F. G. ECHOLS.
MACHINE FOR RELIEVING TOOLS.
APPLICATION FILED AUG. 25, 1902.
NO MODEL. 5 SHEETS—SHEET 1.

Witnesses:
F. G. Campbell
Wm. P. Laraway

Inventor:
Francis G. Echols.
By his Attorneys:

No. 730,445. PATENTED JUNE 9, 1903.
F. G. ECHOLS.
MACHINE FOR RELIEVING TOOLS.
APPLICATION FILED AUG. 25, 1902.
NO MODEL. 5 SHEETS—SHEET 2.

Fig. 2.

Witnesses:
F. G. Campbell.
Wm. P. Laraway

Inventor:
Francis G. Echols.
By his Attorneys:

No. 730,445. PATENTED JUNE 9, 1903.
F. G. ECHOLS.
MACHINE FOR RELIEVING TOOLS.
APPLICATION FILED AUG. 25, 1902.
NO MODEL. 5 SHEETS—SHEET 4.

Witnesses:
F. G. Campbell
Wm P. Laraway

Inventor:
Francis G. Echols.
By his Attorneys:

No. 730,445. PATENTED JUNE 9, 1903.
F. G. ECHOLS.
MACHINE FOR RELIEVING TOOLS.
APPLICATION FILED AUG. 25, 1902.
NO MODEL. 5 SHEETS—SHEET 5.

Witnesses:
F. G. Campbell
Wm. P. Laraway

Inventor:
Francis G. Echols:
By his Attorneys:
Blodgett & Peck

No. 730,445. Patented June 9, 1903.

UNITED STATES PATENT OFFICE.

FRANCIS G. ECHOLS, OF HARTFORD, CONNECTICUT, ASSIGNOR TO THE PRATT AND WHITNEY COMPANY, OF HARTFORD, CONNECTICUT, A CORPORATION OF NEW JERSEY.

MACHINE FOR RELIEVING-TOOLS.

SPECIFICATION forming part of Letters Patent No. 730,445, dated June 9, 1903.

Application filed August 25, 1902. Serial No. 120,954. (No model.)

*To all whom it may concern:*

Be it known that I, FRANCIS G. ECHOLS, a citizen of the United States, residing at Hartford, in the county of Hartford and State of Connecticut, have invented certain new and useful Improvements in Machines for Relieving-Tools, of which the following is a specification.

My invention relates to machines for relieving the "lands" or ribs of tool-blanks, such as reamer or tap blanks; and it has for its object the provision of improved mechanism for accurately and expeditiously accomplishing this result.

A further object of the invention is the provision of improved means for simultaneously rocking the work-supports with relation to the grinding-disk or other relieving-tool employed.

A further object of the invention is the provision of centers for supporting the tool-blank and of improved means for adjusting said centers to vary the position of said blank, whereby any desired amount of "relief" may be obtained.

A further object of the invention is the provision of a reciprocating carriage, head and tail stocks adjustably secured to said carriage, shafts journaled in said stocks, centers carried by the shafts, and eccentric or equivalent devices connected to said shafts and serving simultaneously to oscillate them, to cause the tool-blank mounted on the centers to rock in a path eccentric to the plane of rotation of the relieving-tool.

Other objects of the invention will be hereinafter set forth.

In the accompanying drawings.

Like characters designate similar parts throughout the several views.

Figure 2:
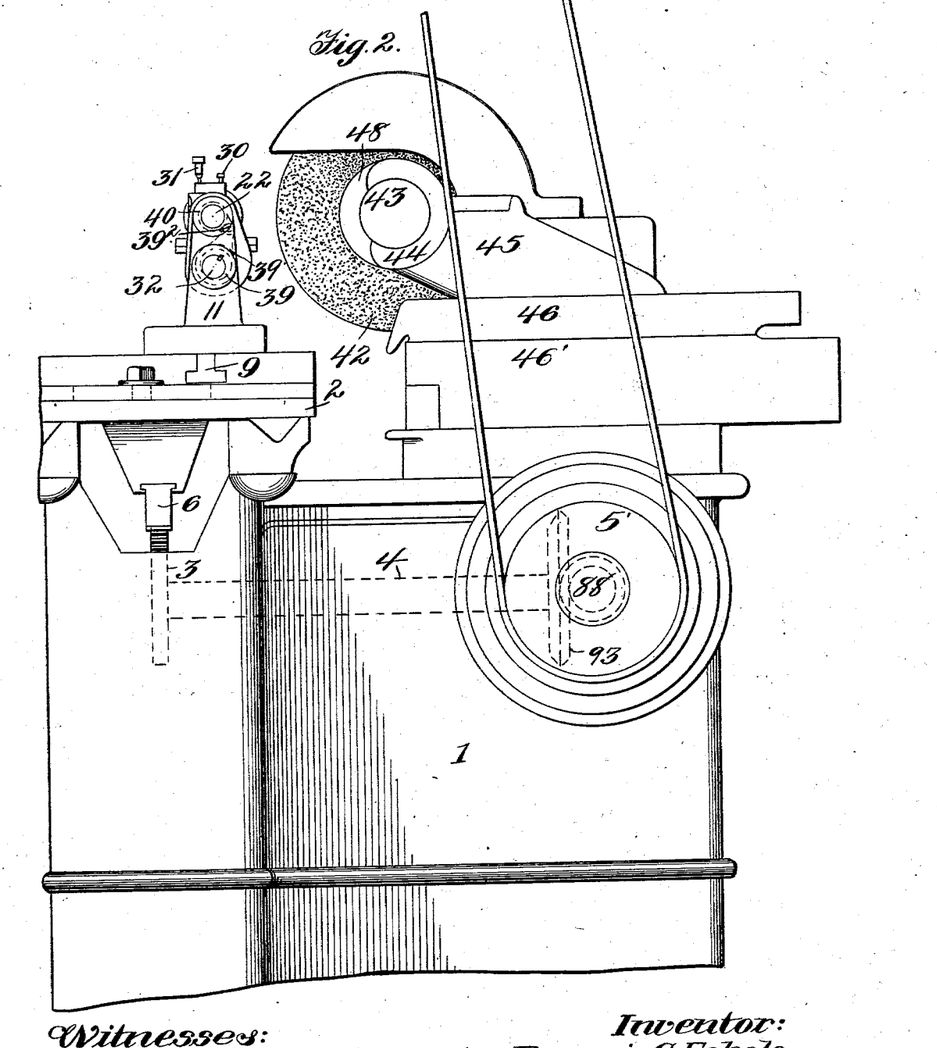
Fig. 2 is an end view showing by dotted lines mechanism for reciprocating the carriage which may be employed.

Referring to the drawings, the numeral 1 designates a suitable framework or sustaining-bed, upon which a carriage 2 is mounted for longitudinal movement by any desired means—as, for instance, a pinion 3, to which power may be applied by a shaft 4, driven by gearing, (designated in a general way by 5,) said pinion being in engagement with a rack 6 on the carriage, as shown in Fig. 2.

Figure 1:
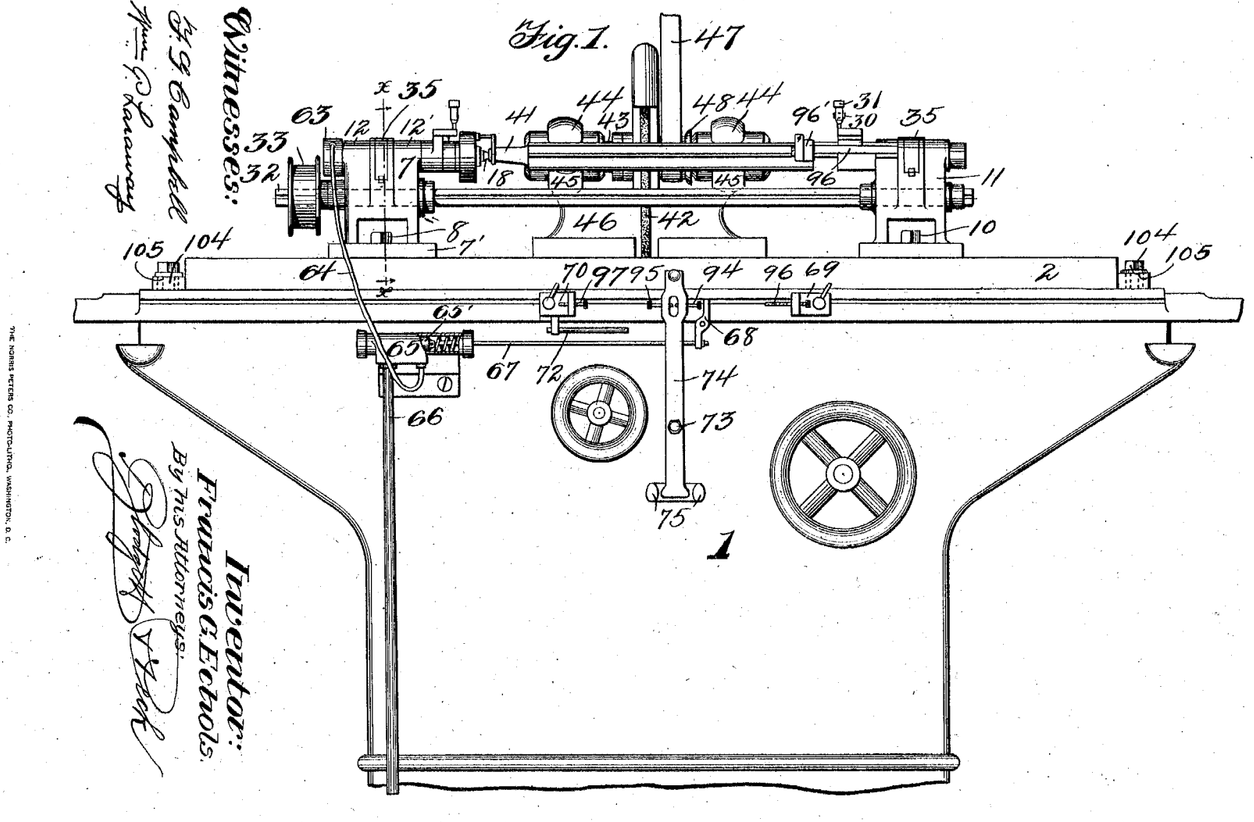
Figure 1 is a side elevation of a machine involving my invention.

Mounted in any desired way upon the carriage 2 is a head-stock 7, the base 7' of which is shown secured in position in a conventional manner by a bolt 8, whose threaded end will be inserted in the usual T-shaped nut (not shown) fitted for sliding movement in a longitudinal groove 9 of similar form. Also adjustably secured to the carriage by a bolt 10 and similar nut (not shown) fitted in the groove 9 thereof is a tail-stock 11, as shown in Figs. 1 and 2.

Figures 5, 6, 7, 8, 9, 15:
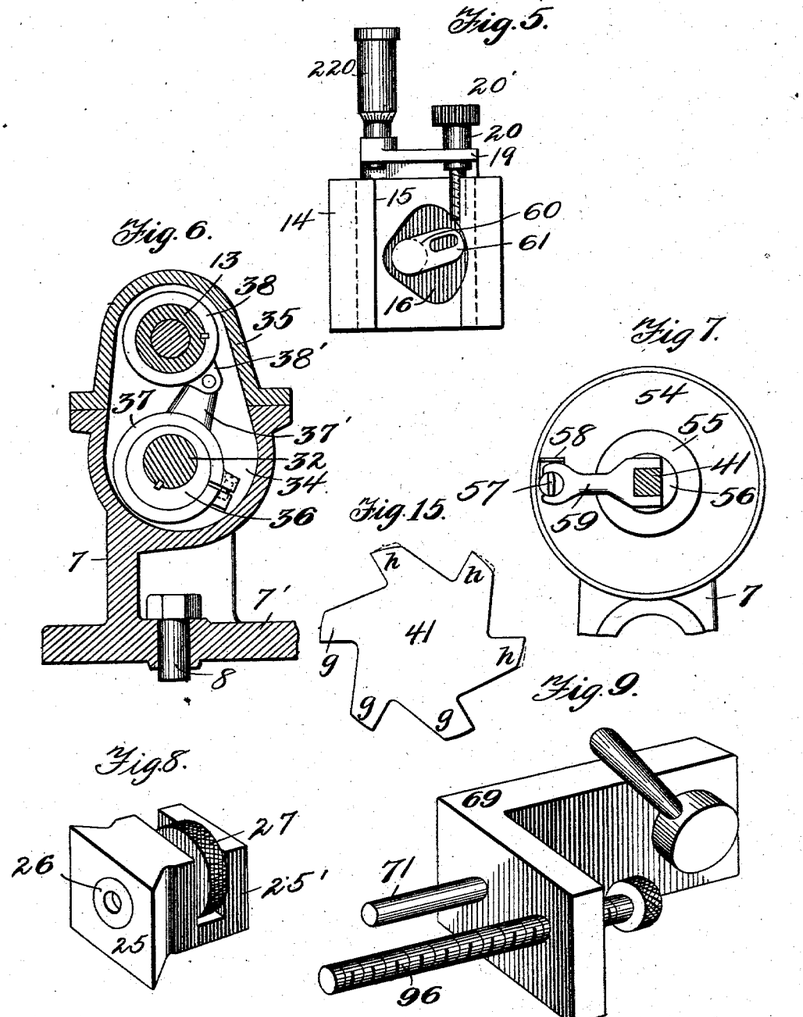
Fig. 5 is a view in elevation of a recessed guide-block carried by the head-stock of the machine and an end view of a crank hereinafter described.
Fig. 6 is a transverse section on line $x\,x$ of Fig. 1 of the head-stock looking in the direction of the arrow.
Fig. 7 is a front view of the head-stock, showing the dog for connecting the indexing mechanism with the tool-blank, the latter being represented in section.
Fig. 8 is a perspective view of the slide in which the dead-center is adjustably mounted.
Fig. 9 is a perspective view of one of the stop-brackets and its stops employed with the carriage of the machine.
Fig. 15 is an enlarged end view of a reamer-blank, showing certain teeth that have been relieved and other teeth which have not been relieved.

In bearings 12 12' of the head-stock 7 is journaled what is shown as a tubular shaft 13, although for the purposes of this invention it may be either solid or tubular, as desired, said shaft having a head 14 at its forward end provided with a guideway 15, the latter being shown recessed at 16 (see Fig. 5) for a purpose hereinafter stated. Fitted in the guideway 15 is a slide 17, (shown detached in Fig. 10,) said slide having an arcuate slot 17' for the reception of a wrist-pin hereinafter described and carrying the head-center 18. Mounted in an arm or flange of a bracket 19 of the head 14 is a screw 20, tapped into an opening 21 in the slide, said screw having a knurled head 20' to afford a convenient hand-grasp, as illustrated in Fig. 5.

Upon the upper end of the slide 17 is a short stud or projection $17^2$, and fitted in an opening of the bracket over said stud is a vernier 220, which may be set in the manner common to such instruments to obtain an exact micrometric adjustment of the slide by the screw 20.

Mounted for oscillating movement in the bearings of the tail-stock 11 is a shaft 22, having a head 23, provided with a guideway 24 for the reception of a slide 25, (shown detached in Fig. 8,) said slide having projecting from it a U-shaped or channeled support 25', and all the parts of the slide being perforated to receive an externally-threaded tubular carrier 26, capable of adjustment by means of a hand-nut 27, located in the channel of the slide and in engagement with the threads of said carrier. At its rear extremity the carrier is closed and contains a spring 28, which bears against the end of a dead-center 29, this construction constituting what is technically known as a "pump-center." For adjusting this slide in the guideway of the head a screw 30 and a vernier 31 are employed, said devices being duplicates of those shown in Fig. 5 for accomplishing a like result with the head-center slide.

Mounted in bearings of the head and tail stocks is a longitudinally-grooved shaft 32, to which power may be applied by a belt upon a pulley 33 or in other desired manner. Each of the stocks mentioned is chambered at 34 to receive shaft 32 and each is provided with a removable chambered cap or cover 35 for inclosing and protecting the parts, as shown in Figs. 1 and 6. Splined to the shaft 32 and located within the chamber of head-stock 7 is an eccentric 36, the strap 37 of which has an arm 37', articulated to an arm 38', projecting from a strap 38, keyed to the shaft 13, and similarly connected to said shaft 32, within the chamber of tail-stock 11, is an eccentric 39, the strap 39' of which carries an arm $39^2$, articulated to a ring or strap 40, keyed to the shaft 22.

When power is applied to the pulley 33 to rotate the shaft 32, the eccentrics will of course also be rotated and through the connections described will impart a simultaneous rocking movement to the shafts 13 and 22.

As above stated, this invention is designed more particularly for relieving the lands of fluted tool-blanks—such as reamer and tap blanks—but it is not limited to such use, for many of its parts and combinations of elements may be employed for different work, if desired, and in the drawings a reamer-blank 41 is shown mounted on the centers 18 and 29 in position to be rocked or oscillated on an axis determined by the position of the center-carrying slides 17 and 25 in the guideways of the heads 14 and 23 of shafts 13 and 22.

Designated by 42 is a relieving-tool, shown as a grinding-disk carried by a shaft 43, journaled in bearings 44 of standards 45 of a slide 46, movable on the usual swinging base 46', ordinary means (not shown) being employed for adjusting said slide back and forth to locate the disk properly with relation to the tool-blank and the shaft 43 being driven by a belt 47 in engagement with a pulley 48 on the shaft or in any other desired way.

For connecting the head 14 of shaft 13 with the blank to be relieved any desired means may be employed; but there is shown for this purpose indexing mechanism, constituting no part of the present invention, such mechanism being fully set forth in my contemporaneously-pending application, filed August 25, 1902, Serial No. 120,953, and it will now be briefly described.

Figure 3:
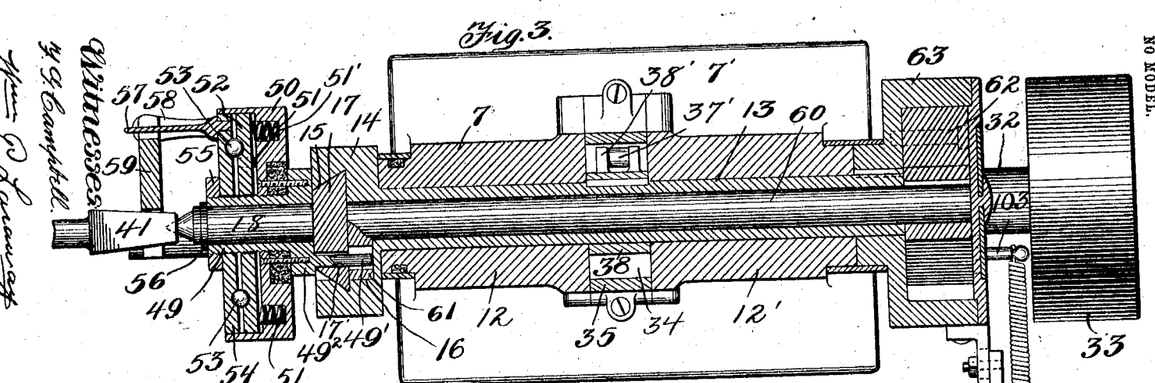
Fig. 3 is a horizontal section of the head-stock and parts carried thereby, certain elements being in elevation.
Figure 4:
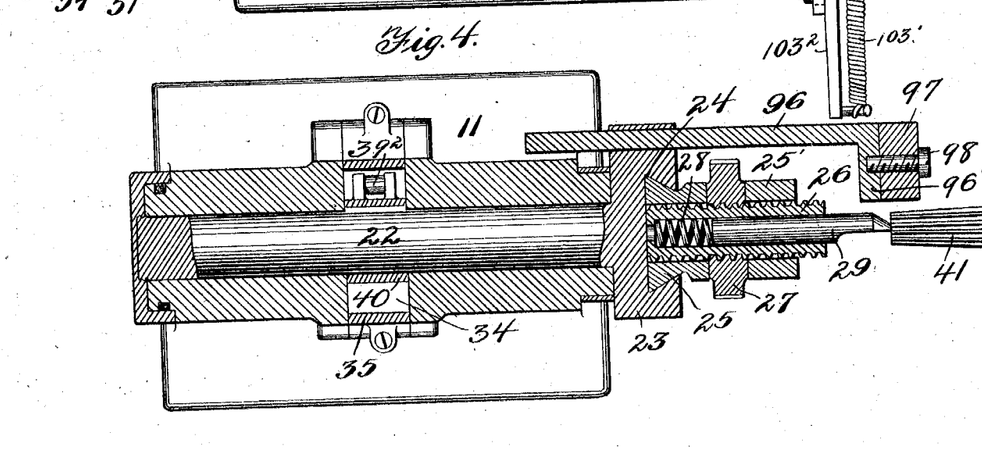
Fig. 4 is a horizontal section of the tail-stock and head carrying the dead-center.

Loosely mounted upon the head-center 18 is an externally-threaded sleeve 49, having a wrist-pin 49' and a flanged base $49^2$, as shown in Fig. 3, and secured to this base is a cup-like or flanged plate 50, the base of said plate having a series of pockets in which are seated spiral springs 51 and carrying clutch lugs or projections 51', one of which is shown by dotted lines in said Fig. 3. Fitted loosely upon the sleeve 49 is a friction-disk 52, against which the springs 51 press and in perforations of which the clutch-lugs 51' are received, said disk being shown as having a raceway for the reception of balls 53. In front of said disk is a second friction-disk 54, also loosely surrounding the sleeve and having a complemental raceway; but both the raceways and the balls may be omitted, if desired, and threaded upon the sleeve is a nut 55, the latter bearing against the face of the disk 54 and serving to press said disks together within the flange of the cup-like plate and to force the disk 52 against the springs 51, in virtue of which construction the parts are held together with sufficient pressure to cause them to rock with the head 14, the threaded sleeve being secured upon the center 18 by a washer 56, fitted in notches 18' of said center. Projecting from the friction-disk 54 is an arm 57, and secured to and overlapping said arm is a spring-plate 58, this construction serving to clamp a lathe-dog 59 to said disk 54, said dog engaging the blank, as shown in Figs. 3 and 7. It will thus be seen that when the shaft 32 is rotated the shafts 13 and 22 will be oscillated and through the connections described will cause the blank also to be oscillated on an axis located relatively to the relieving-tool as may be necessary to afford the degree of relief required by the adjustment of the slides carrying the centers in the manner above described.

While the indexing mechanism shown is preferably employed with the improved machine, it is distinctly to be understood that the invention is not limited thereto, for, if desired, it may be omitted altogether and other means employed for connecting the oscillating shafts with the blank to be relieved.

To actuate the indexing mechanism, a shaft 60 is shown mounted in the tubular shaft 13, said shaft having a crank 61, slotted to receive the wrist-pin 49' of the sleeve 49, and said crank oscillating in the chamber 16 of head 14, as illustrated in Fig. 5. In the embodiment illustrated the shaft is actuated by fluid-pressure applied to a piston 62, attached to its rear end and working in a chamber 63, splined to the shaft 13, fluid being admitted to said chamber by a flexible pipe 64, connected to a valve-chamber 65, and the latter receiving its supply from a pipe 66, leading to a compressed-air tank or other source of pressure, as fully disclosed in my application aforesaid. A rod 67 leads to the valve 65' in said valve-chamber, and this rod is connected at its forward end to a lever 68, pivoted to the frame.

Fitted in a groove in the side of the reciprocating carriage 2 are devices for securing the flanged stop-brackets 69 and 70 to said carriage, and projecting from the bracket 69 is a pin 71, (see Fig. 9,) and from a depending lug on bracket 70 is a longer pin 72, as shown in Fig. 1. When the carriage arrives at the limit of its motion either way, it is necessary to shift the valve and admit fluid to the chamber 63, and as this valve must always be moved in the same direction to open it the stop-pins are so arranged that the shorter one, 71, will strike lever 68 above its pivot upon the termination of the stroke to the left of carriage 2, and the longer one, 72, will impinge against the lever below its pivot as the carriage reaches the limit of its movement toward the right, thus, as will be obvious, always actuating the valve-rod in the same direction.

Figure 11:
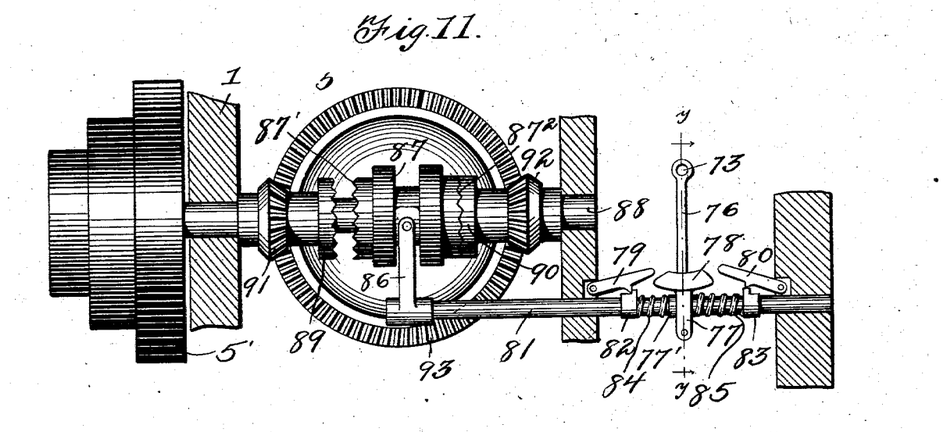
Fig. 11 is a view of mechanism that may be employed for actuating the shaft carrying the pinion in engagement with the rack on the carriage.

To rotate the shaft 4, carrying the pinion 3, which, as above stated, is in engagement with rack 6 of carriage 2, stopping and reversing mechanism of any suitable kind may be employed, and one form of said mechanism is illustrated in Fig. 11, although it is to be understood that the invention is not limited thereto, and will now be described.

Secured to the end of a shaft 73, journaled in the frame, 1 is a lever 74, the lower extremity of which is received between a pair of lugs 75, which limit its motion, and upon the other end of this shaft, on the opposite side of the frame, is secured an arm 76. To this arm is attached a pivoted lever 77, actuating a sleeve 77' and having a bevel-ended shoe 78. Pivoted to the frame are detents 79 and 80, and passing through the sleeve 77' is a rod 81, provided with collars 82 and 83, having lugs adapted to engage the noses of the detents. Surrounding the rod 81 and located between the collars thereon and the ends of sleeve 77' are spiral springs 84 and 85, and connected to the end of the rod is a clutch-shifting yoke 86, fitted in a groove of a sliding clutch 87, having clutch-faces 87' 87².

Designated by 88 is the main driving-shaft, carrying the pulley 5', upon which shaft said clutch is splined, and loosely mounted on said shaft are clutch-sleeves 89 and 90, carrying bevel-gears 91 and 92, in engagement with a large bevel-gear 93, said gear 93 being carried by the shaft 4, having the pinion 3, meshing with rack 6 of the carriage, as shown by dotted lines in Fig. 2.

Projecting from the lever 73 are screws 94 and 95, and threaded into the stop-brackets 69 and 70 are screws 96 and 97, respectively, each screw having a knurled or roughened head to afford a convenient hand-grasp.

Figures 10, 12, 14:
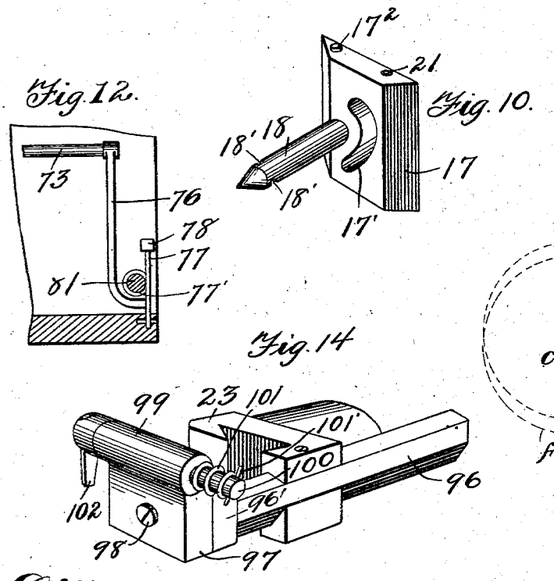
Fig. 10 is a detached perspective view of the head-center and the slide carrying the same.
Fig. 12 is a sectional view of part of said mechanism, taken on line $y\,y$, Fig. 11.
Fig. 14 is a perspective view of a portion of the head supporting the dead-center.

Fitted in a slot of head 23 is an adjustable bar 96, having a head 96', to which a plate 97 is secured by a screw 98, and this head has a bearing 99, in which is mounted a rod 100, longitudinal yielding movement of said rod in its bearing being permitted by a spiral spring 101, surrounding said rod and bearing against a pin 101' thereon and the end of the bearing, as shown in Fig. 14. At its end opposite the spring the rod is provided with a yielding stop-finger 102, which when the blank is indexed will slip over and snap behind the land or rib thereon and which serves to prevent overindexing in the following manner.

As above stated, the indexing mechanism is operated by the shaft 60, actuated by the piston in the chamber 63, and after the supply of pressure fluid is cut off some means must be provided to return the parts to normal position in readiness for a new operation, and to accomplish this result a pin 103 projects from the piston or an arm thereof through a current slot in the end wall of this chamber, and a spring 103', engaging said pin and a fixed support 103², is employed to retract said indexing mechanism and blank, the rib of the latter to be relieved impinging against said yielding stop-finger 102. (See Figs. 1 and 14.)

To permit blanks of tapered form to be relieved, the upper part of carriage 2 may be made as a plate having end lugs 104, said plates being secured to the base of the carriage by bolts 105, passing through curved slots (shown by dotted lines in Fig. 1) in said lugs, this mode of adjustment being well known.

Figure 13:
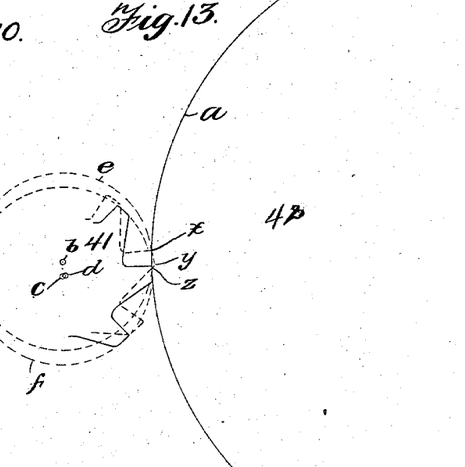
Fig. 13 is a diagram hereinafter described.

In operation my improved machine works as follows: Work of the required kind is placed between the centers 18 and 29 of adjustable stocks 7 and 11, and the dog 59 is engaged therewith and with the clamp of friction-disk 54 in the exemplification given. Slides 17 and 25 are then adjusted to locate the axis of the blank properly in relation to the axis of the shaft 43 of the grinding-disk or other relieving-tool employed, and the slide 46, carrying said tool, is advanced to bring the working surface of the tool into proper position. Power is now applied to the pulleys 5', 33, and 48, and the machine begins to operate, the carriage 2 in the illustration given reciprocating to the left and carrying the rib or land of the tool along the edge of the rotary disk 42. As the carriage moves with the blank the latter is continuously rocked upon the axis, to which it has been set by the adjustment of the slides 17 and 25 by means of the screws and verniers described, and this oscillatory movement imparted by the eccentrics 36 and 39 is fully illustrated in the diagrammatic view Fig. 13, above mentioned. In said view the letter *a* indicates the face of the relieving-tool 42; *b*, the center of shafts 22 and 13; *c*, the axis of the tool-blank prior to the oscillation of the same, and *d* the position said axis assumes at the limit of the downward oscillation of said blank to throw the edge of its rib or land against the periphery of the relieving-tool. Dotted circle *e* represents the position of said blank before it has been adjusted by the verniers and screws below the axes of shafts 33 and 22 and dotted circle *f* the position of said blank after such adjustment has been made, and the degree of relief imparted when the blank is located as just described being shown by the angle *x y z*.

In the enlarged view, Fig. 15, *g* indicates unrelieved teeth of a reamer-blank, and *h* teeth of the same which have been relieved, the dotted lines *i* showing the amount of relief imparted when a certain adjustment of the slides carrying the centers upon which the blank is supported has been made, such adjustment being variable at will to impart any desired degree of relief to the lands, as above stated. As the carriage reaches the limit of its movement toward the left the land or rib being operated upon, having been constantly swung or oscillated downward in the manner described against the edge of the relieving-tool, is finished, and it therefore becomes necessary to turn or index the blank to bring a new land into position and also to reverse the movement of said carriage, and this is accomplished in the following manner. As before stated, indexing mechanism, the details of which constitute no part of the invention herein claimed, is employed, and as this indexing mechanism is controlled by a valve in valve-chamber 65 it becomes necessary to actuate this valve to admit compressed air or other pressure fluid to the flexible pipe 64, leading to the piston-chamber 63, and this is done by the stop-pin 71 of bracket 69, which, striking the lever 68 above its pivot, causes said lever to pull the valve-rod 67 and open the valve in chamber 65. When the valve is opened, the compressed air or other fluid rushes through pipe 66, valve-chamber 65, and flexible tube 64 and, entering the chamber 63, actuates the piston 62 and, through the indexing mechanism controlled by said piston, turns the blank sufficiently far to bring another land thereof into position, overindexing being prevented by the recoil of the indexing mechanism under the influence of the spring 103' and its connection with said piston, which recoil will throw the rib of the blank against the yielding stop-finger 102. Indexing having thus been accomplished, the screw 96 impinges against the screw-stop 94 of lever 74, thereby oscillating said lever, and through the shaft 73 and other connections described, and shown in Fig. 11, shifts the clutch 87 to reverse the movement of the carriage 2, and at the termination of this reverse movement the stop-pin 72 of bracket 70 will strike lever 68 below its pivot, and thus actuate it in the same direction that it was moved by stop-pin 71, Fig. 9, thereby again opening the valve and causing a new indexing operation to take place, the carriage being again caused automatically to reciprocate to the left by the engagement of the screw-stop 97 with the similar stop 95 of clutch-controlling lever 74. In this way the blank is automatically indexed and the carriage is automatically reversed at the limit of its reciprocation in either direction, one land being completed at the termination of the movement of the carriage toward the left, the blank then being indexed and another land thereof relieved as said carriage returns to the right, and so on until all of the lands of the tool-blank have been finished, when the blank will be removed, a new one inserted, and the operation repeated.

My invention is not limited to the precise devices shown and described nor to any particular arrangement and location of the same, but includes within its purview such changes or substitutions of elements as may be found necessary or convenient; nor is it limited to eccentrics for oscillating the center-carrying shafts, for other devices may be employed for this purpose, if desired.

Having thus described my invention, what I claim is—

1. The combination, with a pair of separated heads, of shafts journaled in said heads; a driving-shaft; eccentrics carried by said driving-shaft; means for connecting said eccentrics with the shafts journaled in the heads; and means for supporting work carried by said shafts.

2. The combination, with work-supports, of a rotary shaft; devices for simultaneously oscillating said work-supports carried by the shaft; and means for connecting said devices with the work-supports, whereby the latter will be simultaneously oscillated.

3. The combination, with head and tail stocks, of shafts mounted in said stocks; means for connecting one of said shafts with work; a pair of eccentrics; a shaft carrying said eccentrics; and means for connecting said eccentrics with the shafts mounted in said head and tail stocks.

4. The combination, with a reciprocatory carriage, of a pair of adjustable supports mounted on said carriage; a rotary shaft; a pair of separated eccentrics carried by said shaft and adjustable thereon; shafts journaled in the supports; devices for connecting the eccentrics with said shafts; and means for connecting one of the shafts journaled in the supports with work to be oscillated.

5. The combination, with a reciprocatory carriage, of head and tail stocks upon said carriage; a shaft journaled in the head-stock; a shaft journaled in the tail-stock; centers carried by said shafts; means for connecting one of the shafts with the work; and means for simultaneously oscillating the shafts.

6. The combination, with a rotating relieving-tool, of a pair of separated shafts; means for supporting said shafts; means for connecting one of said shafts with work to be relieved; and means for simultaneously oscillating the shafts.

7. The combination, with a rotary relieving-tool, of a reciprocatory carriage; head and tail stocks adjustably mounted on said carriage; a shaft mounted for oscillatory movement in the head-stock; a head-center carried by said shaft; a shaft mounted for oscillatory movement in the tail-stock; a center carried by said shaft; means for connecting one of the shafts with work; and means for simultaneously oscillating said shafts.

8. The combination, with a support, of head and tail stocks; means whereby said stocks may be adjusted toward and from each other upon said carriage and then secured in position; a shaft mounted in the head-stock; a shaft journaled in the tail-stock; means for connecting one of said shafts with the tool-blank to be relieved; a rotary shaft entering both of said head and tail stocks; a pair of eccentrics in sliding relation with said rotary shaft but rotating therewith; and means for connecting said eccentrics with the oscillating shafts.

9. The combination, with a relieving-tool, and with means for operating said tool, of a support, one of said elements being reciprocatory with relation to the other; head and tail stocks carried by said support; oscillatory shafts journaled in the head and tail stocks; means for connecting one of the oscillatory shafts with the work; a rotary shaft; and means controlled by said rotary shaft for simultaneously actuating the oscillatory shafts.

10. The combination, with a reciprocatory carriage, of head and tail stocks secured to said carriage; a shaft journaled in the head-stock; a shaft journaled in the tail-stock; means for connecting one of said shafts with work; a rotary shaft; an eccentric secured to said rotary shaft adjacent to the head-stock; an eccentric secured to said rotary shaft adjacent to the tail-stock; means for connecting the straps of the eccentrics with the head and tail stock shafts; and a rotary relieving-tool.

11. The combination, with a support, of head and tail stocks mounted on said support; a shaft journaled in the head-stock, and having a head provided with a guideway; a shaft journaled in the tail-stock, and also having a head provided with a guideway; slides mounted in the guideways of said heads; centers carried by the slides; means for adjusting the slides; means for connecting one of the heads with work supported on the centers; and means for simultaneously oscillating said shafts.

12. In a machine for relieving fluted blanks, the combination, with a reciprocatory carriage, of chambered stocks mounted on said carriage; a rotary shaft; eccentrics located in the chambered stocks; shafts journaled in said stocks; and means for connecting the shafts with the eccentrics.

13. In a machine for relieving fluted blanks, the combination, with a reciprocatory carriage, of chambered stocks adjustably mounted on said carriage; shafts journaled for oscillatory movement in said stocks; means carried by said shafts for supporting the blank; and means located within the chambers of the stocks for oscillating the shafts.

14. In a machine for relieving fluted blanks, the combination, with a relieving-tool, of a support, one of said parts being reciprocatory with relation to the other; a chambered stock mounted on said support; a shaft journaled in said stock for oscillatory movement; a rotary shaft; means located in the chamber of the stock and controlled by said rotary shaft for oscillating the shaft journaled in the stock; and means for connecting the oscillatory shaft with the blank.

15. In a machine for relieving fluted blanks, the combination, with a reciprocatory carriage, of chambered stocks mounted on said carriage; shafts mounted for oscillatory movement in said stocks; eccentrics and means for rotating them located in the chambers of said stocks; connections between the eccentrics and said shafts; means for connecting said shafts with the blank; and a rotary relieving-tool.

16. In a machine for relieving fluted blanks, the combination, with a reciprocatory carriage, of stocks adjustably mounted on said carriage; shafts journaled for oscillatory movement in the stocks; a rotary shaft; eccentrics in sliding connection with said rotary shaft; means for connecting the eccentrics with the oscillatory shafts; means for connecting the blank at one of its ends to one of the oscillatory shafts; means for supporting the other end of said blank; a relieving-tool; and means for actuating said relieving-tool.

17. In a machine of the class specified, the combination, with means for oscillating work, of slides carried by said means; centers upon which the work is supported carried by said slides; screws for adjusting the slides; and verniers for determining the degree of adjustment.

18. In a machine of the class specified, the combination, with oscillatory shafts, each having a head provided with a guideway, of slides mounted in the guideways; centers carried by said slides; means carried by one of said centers for connecting it with the work; and a rotary relieving-tool along which the blank is reciprocated by the carriage.

19. In a machine of the class specified, the combination, with oscillatory shafts, each having a head, of slides mounted in guideways of said heads; centers carried by the slides; a sleeve mounted on one of the centers; means for connecting the sleeve with the work; and means for oscillating the shafts.

20. In a machine of the class specified, the combination, with oscillatory shafts, each having a head provided with a guideway, of means for simultaneously oscillating said shafts; slides mounted in the guideways of said heads; centers carried by the slides; a sleeve mounted on one of the centers; and means, including a dog, for connecting said sleeve with the work.

21. In a machine of the class specified, the combination with head and tail stocks, of shafts mounted in said stocks, means for simultaneously oscillating said shafts; centers carried by the shafts; devices controlled by one of the shafts for connecting it with the work; and a tool for dressing said work.

22. In a machine of the class specified, the combination, with shafts, of means for simultaneously oscillating said shafts; centers, upon which the blank is supported, carried by said shafts; means for connecting one of the shafts with said blank; a relieving-tool; and means for actuating said tool.

23. In a machine of the class specified, the combination, with shafts, of means for simultaneously actuating said shafts; centers carried by said shafts; a device mounted on one of the centers; means for connecting said device with the work; a rotary relieving-tool; and means for actuating said tool.

24. In a machine of the class specified, the combination, with a reciprocatory carriage, of a spindle; a relieving-tool carried by said spindle; stocks mounted for adjustment toward and from each other on the carriage; shafts journaled for oscillatory movement in said stocks; means for simultaneously oscillating said shafts; and means for supporting and oscillating work carried by said shafts.

25. In a machine of the class specified, the combination, with a reciprocatory carriage, and with gearing for actuating the same, of a rotary spindle; a relieving-tool mounted on said spindle; head and tail stocks secured to the carriage; oscillatory shafts in said stocks; means for simultaneously oscillating said shafts; means for supporting work carried by said shafts; and means controlled by the shaft in the head-stock for causing said work to move with the oscillatory shafts.

26. The combination, with a reciprocatory carriage, of gearing for actuating said carriage; head and tail stocks mounted on the carriage; oscillatory shafts in said stocks, each shaft having a guideway; means for simultaneously oscillating said shafts; slides mounted in the guideways; centers carried by the slides; and means including frictionally-locked devices for connecting one of the centers with the work.

27. The combination, with a carriage, and with means for reciprocating the same, of chambered stocks adjustably mounted on said carriage; a rotary shaft having a longitudinal groove journaled in said stocks; eccentrics carried by said shaft; means for connecting the eccentrics with said oscillatory shafts; and means for supporting and connecting work to said oscillatory shafts.

28. The combination, with a reciprocatory carriage, of head and tail stocks mounted on said carriage, shafts, each having a head provided with a guideway, journaled in said stocks; means for simultaneously oscillating said shafts; slides mounted in the guideways; screws carried by the heads for adjusting said slides; means for gaging the degree of adjustment of the slides; and means for supporting work carried by the slides; and a rotary tool for dressing said work.

29. In a machine of the class specified, the combination, with a support, of a shaft mounted therein, said shaft having a grooved head; a slide having an extension mounted in the groove of said head; an externally-threaded, tubular carrier mounted in an opening of the slide and the extension thereof; a nut for adjusting said carrier; and a center fitted in a bore of the carrier.

30. The combination, with a head-stock, of a shaft journaled for oscillatory movement therein, said shaft having a head provided with a guideway; a slide fitted in said guideway; a center projecting from the slide; means for connecting said center with work; a tail-stock; a shaft mounted for oscillatory movement in said tail-stock, and having a guideway; a slide movable in said guideway; a "pump-center" carried by the slide; and means for simultaneously actuating the oscillatory shafts.

31. The combination, with a support having a guideway, of a perforated slide mounted in said guideway; a tubular carrier mounted in the slide; means for adjusting said carrier; and a yielding center located in the bore of the carrier.

32. The combination, with chambered head and tail stocks, of a rotary shaft passing through said stocks, eccentrics carried by the shaft and one located in each of the stock-chambers; straps surrounding said eccentrics and having arms; shafts mounted for rocking movement in said stocks; straps on said shafts, the straps being articulated to said arms; and means for supporting and oscillating the work to be relieved carried by the shafts.

33. The combination, with a carriage, of means for supporting and oscillating work mounted thereon; adjustable stops on the carriage; and means controlled by said stops for advancing and retracting said carriage.

34. In a machine of the class specified, the combination, with a reciprocatory carriage, of head and tail stocks adjustably secured to said carriage; automatically-controlled gearing for reciprocating said carriage; oscillatory shafts journaled in the head and tail stocks, each shaft having a head at its end containing a guideway; slides fitted in the guideways of the heads; means carried by the heads for adjusting said slides; centers carried by the slides; means for connecting one of the centers with work to be relieved; a grooved shaft; eccentrics carried by said shaft; and means for connecting the straps of the eccentrics with the oscillatory shafts.

35. In a machine of the class specified, the combination with a rotary grinding-disk of a reciprocatory carriage; gearing for actuating said carriage; chambered head and tail stocks adjustably secured to the carriage, a rotary shaft journaled in bearings of said head and tail stocks, said shaft having a longitudinal groove; eccentrics splined to said shaft and adapted to slide along the same when the head and tail stocks are adjusted; shafts journaled in said head and tail stocks and each having a head; means for connecting said shafts with the eccentrics; centers carried by the heads of said shafts; a sleeve upon one of the centers; and means carried by the sleeve for connecting said sleeve with a blank supported between the centers.

In testimony whereof I affix my signature in presence of two witnesses.

FRANCIS G. ECHOLS.

Witnesses:
E. D. CLARK,
L. A. THURBER.